(12) United States Patent
Döring

(10) Patent No.: US 7,802,419 B2
(45) Date of Patent: Sep. 28, 2010

(54) EXHAUST GAS POST TREATMENT SYSTEM

(75) Inventor: Andreas Döring, München (DE)

(73) Assignee: MAN Nutzfahrzeuge (DE)

( * ) Notice: Subject to any disclaimer, the term of this patent is extended or adjusted under 35 U.S.C. 154(b) by 335 days.

(21) Appl. No.: 11/840,127

(22) Filed: Aug. 16, 2007

(65) Prior Publication Data

US 2008/0041050 A1 Feb. 21, 2008

(30) Foreign Application Priority Data

Aug. 16, 2006 (DE) .................. 10 2006 038 289

(51) Int. Cl.
*F01N 3/00* (2006.01)

(52) U.S. Cl. .................. 60/286; 60/274; 60/288; 60/295; 60/301

(58) Field of Classification Search ........... 60/286–288, 60/295, 297, 301, 303, 311
See application file for complete search history.

(56) References Cited

U.S. PATENT DOCUMENTS

| | | | |
|---|---|---|---|
| 4,902,487 A | 2/1990 | Cooper et al. | |
| 6,805,849 B1 | 10/2004 | Andreasson et al. | |
| 6,871,489 B2 * | 3/2005 | Tumati et al. | ............ 60/285 |
| 6,928,806 B2 | 8/2005 | Tennison et al. | |
| 7,135,153 B2 * | 11/2006 | Bartley et al. | ............ 422/168 |
| 7,181,906 B2 * | 2/2007 | Dalla Betta et al. | ............ 60/286 |

FOREIGN PATENT DOCUMENTS

| | | |
|---|---|---|
| AT | 501 066 | 6/2006 |
| DE | 40 38 054 | 6/1992 |
| DE | 101 23 359 | 11/2002 |
| DE | 102 18 255 | 11/2003 |
| EP | 0 169 939 | 2/1986 |
| EP | 1 052 009 | 11/2000 |
| EP | 1 072 765 | 1/2001 |

* cited by examiner

*Primary Examiner*—Thomas E Denion
*Assistant Examiner*—Diem Tran
(74) *Attorney, Agent, or Firm*—Robert W. Becker; Robert Becker & Assoc.

(57) ABSTRACT

Exhaust gas post treatment system for nitrogen oxide reduction of internal combustion engines operated with excess air. A partial exhaust gas stream is branched off upstream of an SCR catalytic converter for reducing nitrogen oxides. A metering device delivers to the partial exhaust gas stream reduction agent, which is ammonia or a material that releases ammonia downstream of the supply location as a result of the hot exhaust gas. The partial exhaust gas stream is returned to the exhaust gas stream downstream of the supply location and upstream of the SCR catalytic converter, which reduces the 1J nitrogen oxides in the exhaust gas stream with the aid of the ammonia or released ammonia, by selective catalytic reduction, to nitrogen and water vapor. At engine operating conditions at which reversal of the exhaust gas stream toward the engine occurs, an oxidation catalytic converter, disposed in the partial exhaust gas stream upstream of the supply location for the reduction agent, oxidizes ammonia and/or reduction agent decomposition products that flow back.

33 Claims, 2 Drawing Sheets

EXHAUST GAS POST TREATMENT SYSTEM

The instant application should be granted the priority date of 16 Aug. 2006 the filing date of the corresponding German patent application DE 10 2006 038 289.7.

BACKGROUND OF THE INVENTION

The present invention relates to an exhaust gas post treatment system for internal combustion engines, such as diesel engines and gasoline engines having direct injections that are operated with excess air.

Limited exhaust gas components which result during combustion processes and the permissible emissions of which are continuously being lowered, include, in addition to solid particles, nitrogen oxides. To minimize these exhaust gas components with internal combustion engines operated in motor vehicles, various methods are presently used. The reduction of the nitrogen oxides generally occurs with the aid of catalysts, and in oxygen-rich exhaust gas a reduction agent is additionally required in order to increase the selectivity and $NO_x$ conversions These methods have become know by the collective term SCR processes, whereby SCR stands for "Selective Catalytic Reduction", it has been used for many years in the power plant industry, and in recent times also with internal combustion engines. A detailed illustration of such processes can be found in DE 34 28 232 A1. $V_2O_5$-containing mixed oxides, for example in the form of $V_2O_5/WO_3TiO_2$, can be used as SCR catalysts. Typical $V_2O_5$ proportions are between 0.2-3%. In practice ammonia, or compounds that release ammonia, such as urea or ammonium formate, in solid or dissolved form, are used as reduction agents. To convert one mol nitric oxide one mol ammonia is required.

$$4NO+4NH_3+O_2 \rightarrow 4N_2+6H_2O \quad (1)$$

If a platinum-containing NO-oxidation catalytic converter is disposed upstream of the SCR catalyst for the formation of $NO_2$, $$2NO+O_2 \leftrightarrow 2NO_2 \quad (2)$$

The SCR reaction can be considerably accelerated, and the low temperature activity can be significantly raised.

$$NO+2NH_3+NO_2 \rightarrow 2N_2+3H_2O \quad (3)$$

With internal combustion engines operated in vehicles the nitrogen oxide reduction with the aid of the SCR process is difficult for the reason that changing operating conditions exist that make the quantitative metering of the reduction agent difficult. Although on the one hand as high a conversion of the nitrogen oxides as possible should be achieved, on the other hand care must be taken that there is no emission of unused ammonia. To provide a remedial measure, an ammonia-blocking catalytic converter is frequently disposed downstream of the SCR catalyst to convert excess ammonia into nitrogen and water vapor. The use of $V_2O_5$ as active material for the SCR catalyst can also pose a problem if the exhaust gas temperature at the SCR catalyst is greater than 650° C., because $V_2O_5$ then sublimates. For this reason, for high temperature applications iron and copper zeolites that are free of $V_2O_5$ are used.

To minimize the very fine particles, not only in the power plant industry but also with vehicles, either so-called particle separators or particle filters are used. A typical arrangement having particle separators for use in vehicles is described, for example, in EP 1 072 765 A1. Such arrangements differ from those having particle filters in that the diameter of the channels of the particle separator are considerably greater than the diameter of the largest particle that is present, whereas with particle filters the diameter of the filter channels is in the range of the diameter of the particles. As a consequence of this difference, particle filters are subject to becoming clogged, which increases the exhaust gas counter pressure and reduces the engine power. An arrangement and a method using particle filters can be found in EP 0 341 832 A2. The two aforementioned arrangements or methods are characterized in that the oxidation catalytic converter, which is respectively disposed upstream of the particle separator or particle filter, and which is generally a catalyst having platinum as the active material, oxidizes the nitric oxide in the exhaust gas with the aid of the also-contained residual oxygen to nitrogen dioxide, which in turn is converted in the particle separator, or the particle filter, with the carbon particles to CO, $CO_2$, $N_2$, and NO. In this way, a continuous removal of the accumulated very fine particles is effected.

$$2NO_2+C \rightarrow 2NO+CO_2 \quad (4)$$

$$2NO_2+C \rightarrow 2NO+CO \quad (5)$$

$$2C+2NO_2 \rightarrow N_2+2CO_2 \quad (6)$$

A further possibility of removing the carbon particles accumulated in the particle separator or particle filter is to oxidize them in regeneration cycles at high temperatures with the oxygen present in the exhaust gas stream.

$$C+O_2 \rightarrow CO_2 \quad (7)$$

In order to fulfill the exhaust gas regulations that will be applicable in the future it is necessary to simultaneously use not only arrangements for reducing nitrogen oxide emissions, but also arrangements for reducing the emission of very fine particles. For this purpose, already various arrangements and methods have become known.

DE 103 48 799 A1 describes an arrangement that is comprised of an oxidation catalytic converter an SCR catalyst disposed downstream thereof in the exhaust gas stream, and a particle filter that in turn is disposed downstream of the SCR catalyst in the exhaust gas stream. The supply of the reduction agent for the selective catalytic reaction that takes place in the SCO catalyst is effected immediately prior to the SCR catalyst via a urea injection device that is controlled as a function of operating parameters of the internal combustion engine. The drawback of this arrangement is that the nitrogen dioxide produced in the oxidation catalytic converter is essentially completely used up by the selective catalytic reduction in the SCR catalyst, in other words, is no longer available for the conversion of the very fine particles that have accumulated in the downstream particle filter. The regeneration of the particle filter must therefore be realized by an expensive and/or cyclical heating-up of the exhaust gas stream by enriching the exhaust gas stream with non-combusted hydrocarbons. This occurs either by enriching the combustion mixture or introducing fuel ahead of the particle filter. Such an arrangement for regenerating the particle filter is on the one hand complicated and hence expensive, and on the other hand the cyclical regeneration of the particle filter disposed at the end of the arrangement again produces harmful materials that can no longer be removed from the exhaust gas. In addition, when particle filters are used, the filters can become clogged by oil ash, so that they must be removed at specific intervals and must be cleaned.

A further combination of a particle filter and an arrangement for the selective catalytic reduction is known from EP 1 054 722 A1. The arrangement described therein comprises an oxidation catalytic converter that is disposed in the exhaust gas stream and that increases the proportion of nitrogen dioxide in the exhaust gas, a fine material filter disposed downstream thereof, a reservoir for the reduction liquid, as well as an injection device for the reduction fluid that is disposed behind the fine material filter, and additionally an SCR catalytic converter disposed downstream in the exhaust gas stream. Although the above-described arrangement permits a continuous conversion of the fine material particles of the carbon type accumulated in the fine material filter with the aid of the nitrogen dioxide produced in the oxidation catalytic converter, it has another very serious drawback. The particle filter causes a cooling of the exhaust gas, so that for example with the use of the presently commercially available reduction liquid designated AdBlue, the exhaust gas temperature, in particular after start-up of the internal combustion engine, or during operation of the internal combustion engine in a lower output range, is too low to produce ammonia without yielding problematic byproducts from the 33% aqueous urea solution.

In conjunction with the decomposition of urea $((NH_2)_2CO)$ into ammonia $(NH_3)$, it is known that this occurs under optimum conditions (temperatures greater than 350° C.) in two stages; according to $$(NH_2)_2CO \rightarrow NH_3 + HNCO \quad (8)$$

there is first effected the thermolysis, or pyrolysis, ie. the thermal decomposition of urea. Subsequently, according to $$HNCO + H_2O \rightarrow NH_3 + CO_2 \quad (9)$$

there is effected the hydrolysis, in other words, the catalytic conversion of isocyanic acid (HNCO) into ammonia $(NH_3)$ and carbon dioxide $(CO_2)$.

Since with the use of AdBlue the reduction agent is present in a form dissolved in water, this water must be evaporated prior to and during the actual pyrolysis and hydrolysis.

If the temperature present with the previous reaction according to (8) and (9) is less than 350° C., or is heated only slowly, it is known from DE 40 38 054 A1 that essentially solid, non-meltable cyanuric acid results from trimerization of the isocyanic acid formed according to (8) pursuant to $$3HNCO \xrightarrow{<350° C....}_{...>350° C.} (HNCO)_3 \quad (10)$$

which leads to clogging of the following SCR catalytic converter, Remedial action can, as outlined in the aforementioned DE 40 38 054, be provided by guiding the exhaust gas stream that is laden with the reduction agent over a hydrolysis catalytic converter. The exhaust gas temperature from which a quantitative hydrolysis is possible can thus be depressed to 160° C. The construction and composition of an appropriate catalytic converter is also described in the aforementioned publication as are the construction and function of an SCR catalytic converter system that is equipped with a hydrolysis catalytic converter.

In order to reduce the size of the catalytic converters, yet to keep the retention time in the catalytic converters constant, the hydrolysis catalytic converters are also operated in a partial exhaust gas stream that is removed from the exhaust gas stream and after hydrolysis has been completed is returned thereto. A corresponding arrangement is disclosed in EP 1052009 A1. In this connection, it is particularly advantageous if the removal of the partial exhaust gas stream takes place as close to the engine as possible in order to be able to operate the hydrolysis catalytic converter at a high temperature level. With exhaust gas turbocharged internal combustion engines, it is furthermore advantageous to already remove the partial exhaust gas stream upstream of the turbocharger and to return it downstream of the turbocharger. However, with the removal of the partial exhaust gas stream close to the engine, and with the metering of the reduction agent, a problem results. At certain operating states of the internal combustion engine, mainly at low load operation, push operation, engine braking operation, and idling phases, or when the engine is turned off, a reversal of the direction of flow of the exhaust gas can occur, so that reduction agent, ammonia released from the reduction agent, or byproducts formed from the reduction agent, such as isocyanic acid (equation 9), cyanuric acid (equation 10), etc., can come into contact with those components of the engine that contact the exhaust gas, by flow back and/or diffusion in the direction of the engine block. This can lead to corrosion of the materials installed there, especially to the seals.

Proceeding from the previously described state of the art, it is an object of the present invention, while avoiding the drawbacks of the known arrangements, to provide an exhaust gas post treatment system having partial stream hydrolysis that reliably prevents the back flow of the reduction agent and/or of the ammonia released from the reduction agent and/or of the byproducts formed from the reduction agent, such as isocyanic acid and/or cyanuric acid.

BRIEF DESCRIPTION OF THE DRAWINGS

This object, and other objects and advantages in the present invention, will appear more clearly from the following specification in conjunction with the accompanying schematic drawings, in which.

SUMMARY OF THE INVENTION

Figure 1:
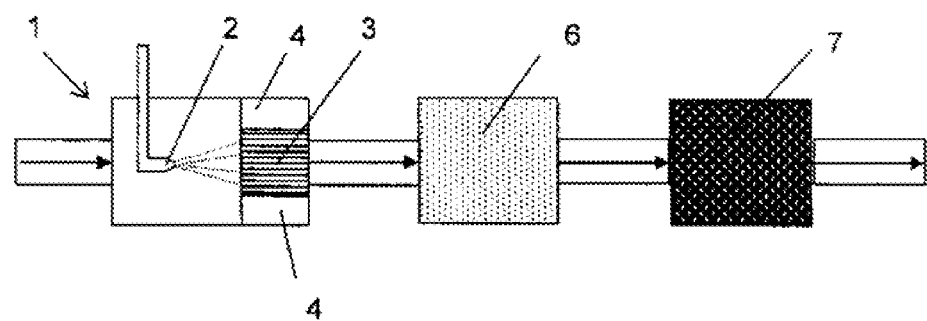
FIG. 1 shows an exhaust gas post treatment system having partial stream hydrolysis according to the state of the art.

Pursuant the present invention, an exhaust gas post treatment system is provided for nitrogen oxide reduction of an internal combustion engine operated with excess air, whereby the nitrogen oxide reduction is effected via an SCR catalytic converter, whereby a partial exhaust gas stream is branched off from the exhaust gas stream upstream of the SCR catalytic converter, whereby a supply tank for a reduction agent and a metering device for the reduction agent are provided, whereby the metering device adds the reduction agent to the partial exhaust gas stream, whereby the reduction agent is ammonia or a material that releases ammonia downstream of the supply location as a result of the hot exhaust gas, whereby the partial exhaust gas stream is returned to the exhaust gas stream downstream of the supply location and upstream of the SCR catalytic converter, wherein the SCR catalytic converter that is disposed downstream of the return location reduces the nitrogen oxides contained in the exhaust gas stream with the aid of the ammonia or released ammonia, by way of selective catalytic reduction to nitrogen and water vapor, wherein an oxidation catalytic converter is disposed in the partial exhaust gas stream upstream of the supply location for the reduction agent, and wherein at engine operating conditions at which a reversal of the exhaust gas stream in the direction toward the internal combustion engine occurs, the oxidation catalytic converter oxidizes ammonia and/or reduction agent decomposition products that flow back.

The realization of the object of the present application is based on achieving the required exhaust gas threshold values in that the nitrogen oxide reduction is effected by an SCR catalytic converter with the aid of ammonia, and the supply of the ammonia or an ammonia-releasing material is effected in a partial exhaust gas stream that branches off from the exhaust gas stream upstream of the SCR catalytic converter. For the supply of the reduction agent (ammonia or ammonia-releasing material) a supply tank for the reduction agent and a metering device for the reduction agent are provided, whereby the metering device adds the reduction agent to the partial exhaust gas stream, and the partial exhaust gas stream is returned to the exhaust gas stream downstream of the supply location and upstream of the SCR catalytic converter. The SCR catalytic converter, which is disposed downstream of the supply location, reduces the nitrogen oxides contained in the exhaust gas stream with the aid of the ammonia or released ammonia, by way of selective catalytic reduction, to nitrogen and water vapor. Disposed in the partial exhaust gas stream, upstream of the supply location for the reduction agent, is an oxidation catalytic converter that at engine operating conditions at which a reversal of the exhaust gas stream in the direction toward the internal combustion engine occurs, oxidizes ammonia and/or reduction agent decomposition products that flow back.

The inventive exhaust gas post treatment system advantageously permits on the one hand the conversion of nitrogen oxides from the exhaust gas to nitrogen and water, and on the other hand, without additional expenditure, in particular for control or regulating devices, prevents ammonia, reduction agent, or byproducts formed from the reduction agent, due to the back flow of exhaust gases that occurs at certain operating conditions of the internal combustion engine, from coming into contact with components of the internal combustion engine that contact the exhaust gas, thus protecting these components from corrosion caused thereby.

The oxidation catalytic converter can be embodied in such a way that on the one hand it oxidizes the ammonia and/or the reduction agent decomposition projects that flow back, and on the other hand at engine operating conditions at which the exhaust gas flows in the normal direction, in other words away from the internal combustion engine, it oxidizes carbon monoxide and/or nitric oxide and/or hydrocarbons carried along in the exhaust gas. As a result, the mentioned exhaust gas substituents in the partial exhaust gas stream are advantageously converted into harmless compounds or into compounds that have value in the subsequent reactions. Thus, for example, as a result of the oxidation of nitric oxide, additional reactive nitrogen dioxide is supplied to the SCR reaction in the SCR catalytic converter.

With the previously mentioned oxidation of ammonia at the oxidation catalytic converter disposed upstream of the supply location for the reduction agent, it is desirable that the reaction continues up to the oxidation state 0, in other words, nitrogen.

$$4NH_3 + 3O_2 \rightarrow 2N_2 + 6H_2O \quad (11)$$

However, this does not always succeed selectively, so that the oxidation often continues to the oxidation state [+1], (laughing gas-$N_2O$), [+2] (nitric oxide-NO), or even [+4] (nitrogen dioxide-$NO_2$).

$$2NH_3 + 2.5O_2 \rightarrow 2NO + 3H_2O \ [+2] \quad (12)$$

$$2NO + O_2 \leftrightarrow 2NO_2 [+4] \quad (13)$$

$$NH_3 + NO_2 \rightarrow 2NO + H_2O \ [+2] \quad (14)$$

$$2NH_3 + 2NO_2 + \tfrac{1}{2}O_2 \rightarrow 2N_2O + H_2O \ [+1] \quad (15)$$

To increase the selectivity relative to nitrogen in the partial exhaust gas stream, a further SCR catalytic converter for the selective reduction of nitrogen oxides with the aid of ammonia that flows back is disposed downstream of the oxidation catalytic converter and upstream of the supply location for the reduction agent. In this way, ammonia that flows back is first advantageously oxidized with the aid of nitrogen oxides contained in the partial exhaust gas stream, according to the equations (1) and (3). This reaction takes place very selectively, thus avoiding the formation of undesired byproducts, such as laughing gas or nitrogen oxides. Only when no nitrogen oxides are any longer present in the exhaust gas do ammonia and/or reduction agent decomposition products encounter the actual oxidation catalytic converter, which is disposed upstream of the SCO catalytic converter, and where the reaction then takes place with a greatly reduced quantity of residual ammonia, essentially according to the reaction equation (11).

The oxidation catalyst converter in the partial exhaust gas stream, and the further SCR catalytic converter disposed downstream thereof, can advantageously be combined to form a single component, which minimizes the installation space required. In this connection, it is particularly advantageous to provide the oxidation catalytic converter in the partial exhaust gas stream with an SCO activity for nitrogen oxides, for example via a coating having appropriate active catalyst material.

For the facilitation of the release of ammonia from the reduction agent, a hydrolysis catalytic converter can be disposed downstream of the supply location or the reduction agent. It is furthermore advantageous to dispose at least one separation device for the separation of particles out of the exhaust gas, in the partial exhaust gas stream and/or in the exhaust gas stream downstream of the supply locations for the reduction agent.

By arranging a further oxidation catalytic converter in the exhaust gas stream upstream of the return location of the partial exhaust gas stream, which during the normal direction of flow of the exhaust gas converts the nitric oxide contained in the exhaust gas stream at least partially to nitrogen dioxide, by increasing the proportion of nitrogen dioxide on the one hand the condition is provided for the advantageous continuous regeneration of a downstream separation device for the separation of particles from the exhaust gas, and on the other hand available for the SCR reaction is also a higher proportion of the more reactive nitrogen dioxide, which advantageously increases the conversion of nitrogen oxides.

Platinum and/or palladium and/or iridium and/or their oxides and/or IrTiO$_x$ and/or zeolites can advantageously be used as active materials for the aforementioned oxidation catalytic converter for the oxidation of ammonia as well as for the further oxidation catalytic converter.

For the oxidation catalytic converter disposed in the partial exhaust gas stream for the oxidation of ammonia, it is advantageous to provide different properties as viewed in the direction of flow of the exhaust gas, such that that side adjacent to the supply location for the reduction agent oxidizes ammonia, preferably selectively, to nitrogen and water, while the opposite side, in contrast, oxidizes carbon monoxide and/or nitric oxide and/or hydrocarbons that are carried along in a conversion-optimized manner. This can be advantageously achieved if that side adjacent to the supply location for the reduction agent has a greater charge with palladium and/or iridium and/or zeolites than does the side that faces the internal combustion engine. The same effect can be achieved if that side of the oxidation catalytic converter adjacent to the supply location for the reduction agent has a lower charge with platinum and/or oxides thereof than does the side that faces the internal combustion engine.

Vanadium and/or vanadium pentoxide and/or titanium dioxide and/or tungsten oxide and/or copper-containing zeolites and/or iron-containing zeolites and/or cobalt-containing zeolites can advantageously be used as active components for the SCR catalytic converters for the reduction of nitrogen oxides with the aid of ammonia. For the improvement for the release of ammonia, titanium dioxide and/or silicon dioxide and/or aluminum oxide and/or zeolites can be used as active components for the hydrolysis catalytic converters.

With internal combustion engines that are turbocharged by means of exhaust gas turbochargers, it can be advantageous to dispose the branching off of the partial exhaust gas stream, into which the reduction liquid is sprayed or otherwise introduced, upstream of the turbine of the exhaust gas turbocharger in order to provide as high a temperature level as possible for the release of the ammonia. If the turbine is a double-flow turbine, whereby one channel is supplied with exhaust gas From at least one first cylinder and the other channel is supplied with exhaust gas from at least one second cylinder, it is advantageous to branch the partial exhaust gas stream off from one of the two channels. The cylinders of the channel from which the partial exhaust gas stream is branched off can then be operated with other engine parameters than are the cylinders of the other channel so that it is advantageously possible to optimize the conditions in the partial exhaust gas stream with regard to the preparation of the reduction agent, for example by raising the exhaust gas temperature in the start-up phase or in the low load range.

If the internal combustion engine has two exhaust gas turbocharges, whereby the turbines of one of the turbochargers is supplied with exhaust gas from a first bank of cylinders of the internal combustion engine, and the turbines of the other turbocharger are supplied with exhaust gas from a second bank of cylinders of the internal combustion engine, it is advantageous if the partial exhaust gas stream is branched off from the exhaust gas stream upstream of the turbine of one of the two exhaust gas turbochargers. The cylinders of the bank of cylinders, from the exhaust gas section of which the partial gas stream branches off, can be operated with other engine parameters than are the cylinders of the other bank of cylinders. In this way, here also an advantageous optimization of the conditions in the partial exhaust gas stream with regard to the preparation of the reduction agent is possible by, for example, increasing the exhaust gas temperature in the start-up phase or in the low load range.

For the exact metering of the reduction agent, it can furthermore be advantageous to dispose a flow-control element in the partial exhaust gas stream that controls or regulates the volume velocity of the exhaust gas and/or the exhaust gas quantity in the branched-off portion.

In order with internal combustion engines installed in vehicles during pushing operation or during motor braking operation to relieve the oxidation catalytic converter, which is subjected from the back-flowing exhaust gas to ammonia or reduction agent decomposition products, or to relieve the SCR catalytic converter that is provided it is advantageous to provide a check valve upstream of the supply location. Alternatively, or in addition thereto, it can be advantageous to use a controllable shutoff device, for example in the form of an exhaust gas valve, that is disposed upstream of the supply location in the partial exhaust gas stream, and that if necessary blocks the partial exhaust gas stream. Such a valve that can be controlled can also advantageously serve as a flow-control element that can be controlled or regulated, and would be controllable by the already present engine control unit.

To prevent ammonia slippage, it can furthermore be advantageous to dispose a catalytic converter or a catalyst for the oxidation of ammonia downstream of the SCR catalytic converter.

With regard to the aforementioned oxidation catalytic converters that, as mentioned, serve different purposes, it is advantageous to optimize them by the selection of the respectively best-suited active components to the respective purpose as well as to the respective subsequent chemical reactions.

Since the exhaust gas temperature, as well as the content of nitrogen dioxide in the exhaust gas, significantly influence the effectiveness of the exhaust gas post treatment system, it can be advantageous to vary the exhaust gas temperature or the content of nitrogen dioxide by varying the engine setting via the already present engine control unit. In particular, the exhaust gas temperature and the nitrogen dioxide content can be raised by varying the engine parameters or by supplying hydrocarbons to the exhaust gas stream upstream of the oxidation catalytic converter for the oxidation of nitric oxide (and/or of hydrocarbons and/or of carbon monoxide).

It is furthermore advantageous to combine a plurality of the catalytic converters contained in the exhaust gas post treatment system in a single housing to minimize the cost for the system and in particular the space required for installation for example in commercial vehicles. Particle separators or particle filters should advantageously be constructed in such a way that they are exchangeable or removable.

Further specific features of the present invention will be described in detail subsequently.

Description of Specific Embodiments

Referring now to the drawings in detail, for an explanation of the relationships, FIG. 1 first schematically illustrates an arrangement according to the state of the art with which nitrogen oxides are to be removed from the exhaust gas of an internal combustion engine by way of selective catalytic reduction.

The exhaust gases, which are produced from an internal combustion engine (not illustrated) by the combustion processes, and which are symbolized by the arrows in FIG. 1, first pass into an exhaust gas preparation section 1, in which a reduction agent is added to the hot exhaust gas as close to the engine as possible As is common with motor vehicles having SCR catalytic converters, the reduction agent is an aqueous urea solution; it is, of course, also conceivable to add urea in solid form, as this is already described in detail in the pertinent technical literature. It is furthermore possible to add ammonia as the reduction agent which is recovered at some other location, for example under more favorable thermal conditions, from a material that releases ammonia. The metering or dosing is effected as a function of the operating parameters of the internal combustion engine, controlled by an engine control unit (not illustrated) in such a way that via a nozzle 2, the aqueous urea solution is sprayed into the exhaust gas stream immediately ahead or upstream of a hydrolysis catalytic converter 3. The purpose of the hydrolysis catalytic converter 3 is to convert the aqueous urea solution as completely as possible into ammonia and water vapor while avoiding byproducts. Under certain conditions, this release is also adequately effected without a hydrolysis catalytic converter, so that the latter can then be eliminated. Disposed parallel to the hydrolysis catalytic converter 3 is an oxidation catalytic converter 4, the purpose of which, pursuant to the reaction previously identified by (2), is to oxidize a portion of the nitric oxide contained in the exhaust gas to nitrogen dioxide by means of the excess oxygen present in the exhaust gas.

The actual selective catalytic reduction of the nitrogen oxides is effected in an SCR catalytic converter 6, which is disposed downstream of the hydrolysis catalytic converter 3 and which is intended to convert as great a proportion as possible of the nitrogen oxides ($NO_x$) present in the exhaust gas, with a simultaneously high selectivity of the reduction, into nitrogen and water vapor without excess ammonia ($NH_3$) remaining in the exhaust gas stream. With the indicated SCR reaction, the nitrogen dioxide present in the exhaust gas stream is more reactive than is the nitric oxide contained in the exhaust gas, so that it is desirable to design the oxidation catalytic converter in such a way that as great a proportion of the nitric oxide as possible is converted into nitrogen dioxide.

In view of the constantly changing operating conditions of an internal combustion engine that operates in a motor vehicle, it is obvious that the desired as high as possible, conversion rates of nitrogen oxides can reliably take place only if a slight ammonia excess is accepted In order in situations of insufficient conversion to prevent toxic ammonia from being given off to the atmosphere along with the partially cleaned exhaust gas, disposed downstream of the SCR catalytic converter 6 is an $NH_3$-oxidation catalytic converter 7, via which the excess $NH_3$ is converted into nitrogen and water vapor. This oxidation reaction should take place as selectively as possible.

As already indicated above, if the temperature level at the supply location for the reduction agent is high over the entire operating range, the hydrolysis catalytic converter 3 can be eliminated.

Figure 2:
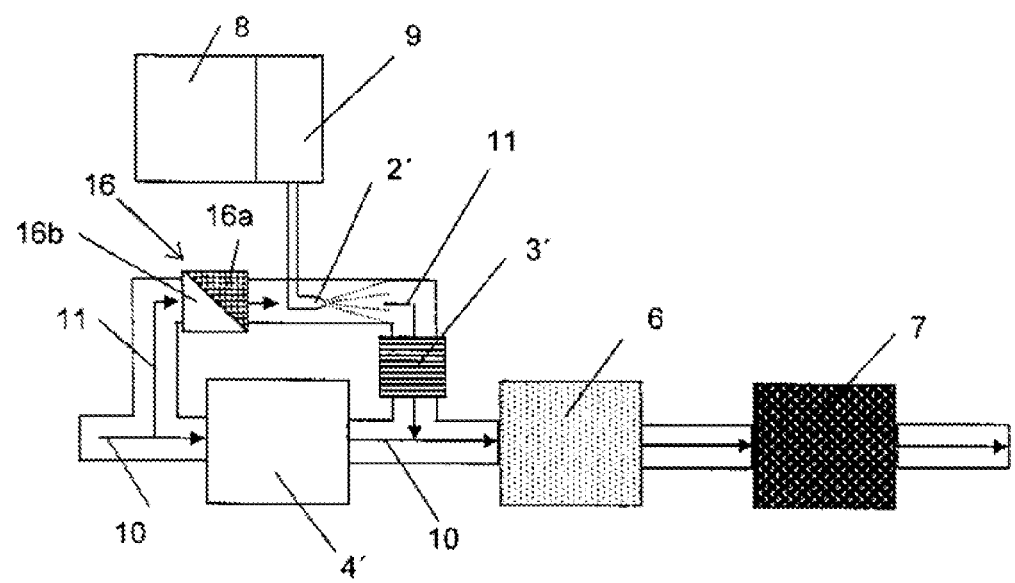
FIG. 2 shows a first exemplary embodiment of an exhaust gas post treatment system having partial stream hydrolysis and protection against back flow in the partial stream.

One embodiment for the inventive exhaust gas post treatment system is shown in FIG. 2.

The arrangement also avails itself of the partial stream hydrolysis, for this purpose, a partial exhaust gas stream 11 is branched off from the exhaust gas stream 10. The reduction agent, in this example aqueous urea solution (AdBlue), is added to the partial exhaust gas stream 11. The metering is effected by a metering device 9, which is controlled as a function of operating parameters of the internal combustion engine, and which removes the aqueous urea solution from a supply tank 8 and via a nozzle 2' sprays or injects prescribed quantities into the exhaust gas stream depending upon the operating state of the internal combustion engine. Disposed downstream of the supply location in the exhaust gas stream is a hydrolysis catalytic converter 3' that, as explained above, promotes the hydrolysis of the reduction agent. The recovery of the partial exhaust gas stream 11, which is now laden with ammonia, is effected downstream of the hydrolysis catalytic converter 3' and upstream of the SCR catalytic converter 6, which is disposed in the exhaust gas stream and is followed by an $NH_3$-oxidation catalytic converter 7. The SCR catalytic converter 6 and the $NH_3$-oxidation catalytic converter 7 are identical to those already described in conjunction with FIG. 1, so that it is not necessary to again describe their function; rather, reference is made to the detailed description of FIG. 1.

As already mentioned, under certain operating conditions of the internal combustion engine, mainly in low load operation, pushing operation, engine braking operation, idling phases, or when the engine is turned off, a reversal of the direction of flow of the exhaust gas can occur. In order in such cases to prevent reduction agent, ammonia released from the reduction agent, or byproducts formed from the reduction agent, such as isocyanic acid (equation 9), cyanuric acid (equation 10), etc., from coming into contact with components of the engine that are contacted by the exhaust gas due to back flows and/or diffusion in the direction of the engine block, an oxidation catalytic converter 16 is disposed upstream of the supply location for the reduction agent. With regard to its active components, the oxidation catalytic converter 16 is designed in such a way that it oxidizes flowing back reduction agent, ammonia released from the reduction agent, or byproducts formed from the reduction agent. In this connection, the selection of the active components of the oxidation catalytic converter is such that the oxidation of ammonia takes places as selectively as possible. Possibilities of active materials for the oxidation catalytic converter 16 are platinum, palladium, iridium, oxides thereof, $IrTiO_x$, and zeolites; with the design and selection, one must take notice of the fact that although a high platinum proportion is necessary for a conversion that is as great as possible, none the less the selectivity of the reaction is negatively influenced.

To expand the function of the oxidation catalytic converter 16, it is designed in such a way that it has different properties as viewed along the direction of flow of the exhaust gas; in particulars such that the side 16a that is adjacent to the supply location for the reduction agent preferably selectively oxidizes ammonia to form nitrogen and water, while the opposite side 16b in contrast oxidizes carbon monoxide and/or nitric oxide and/or hydrocarbons that are carried along in the exhaust gas in a conversion-optimized manner. This can advantageously be achieved in that the side 16a that is adjacent to the supply location for the reduction agent has a higher charge with palladium and/or iridium and/or zeolites than does the side 16b that faces the internal combustion engine. The same effect can be achieved if the side 16a that is adjacent to the supply location for the reduction agent has a lower charge with platinum and/or oxides thereof than does the side 16b that faces the internal combustion engine.

As already mentioned, the return of the partial exhaust gas stream 11 to the exhaust gas stream 10 is effected upstream of the SCR catalytic converter 6. In this connection, the return location should be disposed as directly upstream of the SCR catalytic converter 6 as possible in order to prevent exhaust gas laden With ammonia from flowing back in the exhaust gas stream 10. However, if none the less slight back flows occur in the exhaust gas stream 10, the ammonia that flows back is oxidized by the further oxidation catalytic converter 4' that is disposed in the exhaust gas stream 10 parallel to the partial exhaust gas stream 11. The further oxidation catalytic converter 4' serves to raise the proportion of nitrogen dioxide in the exhaust gas stream 10 in order to improve the conversion of nitrogen oxides that can be achieved in the SCR reaction, and is therefore disposed parallel to the partial exhaust gas stream 11 since in this way the temperature level in the partial exhaust gas stream 11, and in particular at the supply location for the reduction agent, is not negatively influenced. This would be the case if the relatively large further oxidation catalytic converter 4' would be disposed upstream of the partial exhaust gas stream 11.

Figure 3:
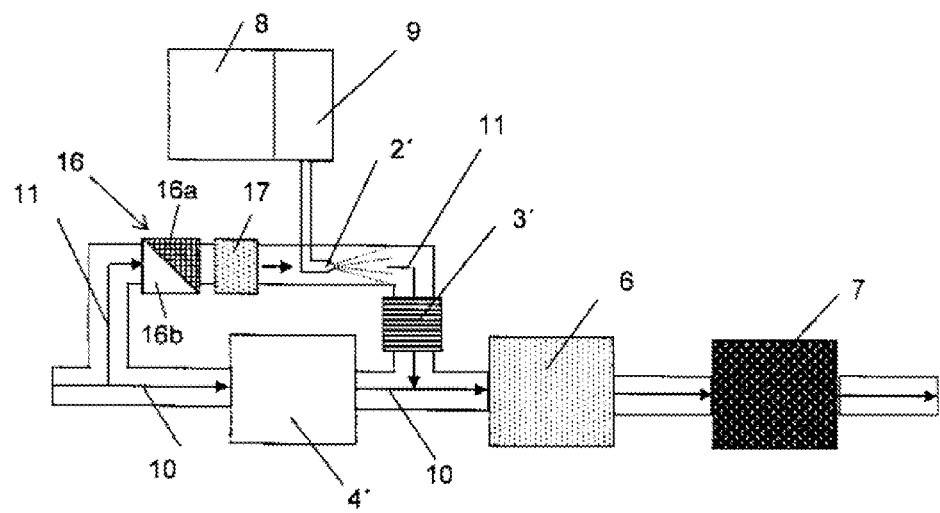
FIG. 3 shows a second exemplary embodiment of an exhaust gas post treatment system having partial stream hydrolysis and protection against back flow in the partial stream.

During the oxidation of ammonia at the oxidation catalytic converter 16 disposed upstream of the supply location for the reduction agent, it is desirable that the reaction be effected selectively, in other words, that it runs to the oxidation state 0 (equation (11)). However, this does not always succeed selectively, so that the oxidation often continues to the oxidation stage [+1] (laughing gas-$N_2O$), [+2] (nitric oxide-NO), or even [+4] (nitrogen dioxide-$NO_2$) (equations (12) to (15)), as already discussed above. An arrangement as shown in FIG. 3 provides a remedial effect. The arrangement shown there differs from the arrangement of FIG. 2 merely in that downstream of the oxidation catalytic converter 16, and upstream of the supply location for the reduction agent in the partial exhaust gas stream 11, a further SCR catalytic converter 17 is disposed. This further SER catalytic converter 17 converts ammonia that might flow back, with the aid of nitric oxide contained in the exhaust gas and residual oxygen according to equation (1), or with the aid of nitric oxide and nitrogen dioxide according to equation (3), highly selectively into nitrogen and water vapor. Only when the nitrogen oxides in the exhaust gas are used up, does the oxidation of the ammonia get effected with the aid of the oxidation catalytic converter 16. Since with the exception of the foregoing, the components and functions of the arrangement of FIG. 3 are identical to those described in FIG. 2; for a description thereof reference is made to the pertinent descriptions of FIG. 2.

Figure 4:
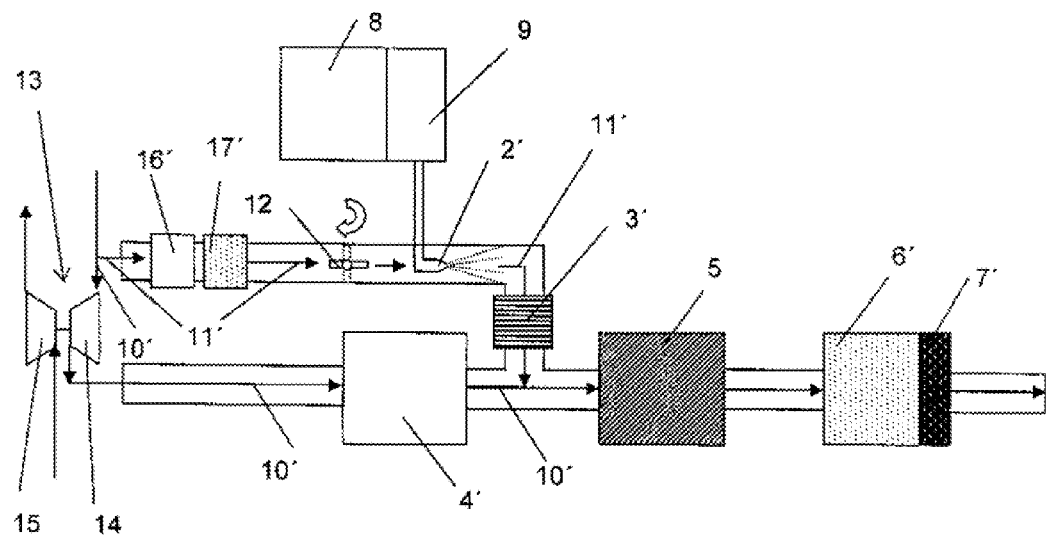
FIG. 4 shows an exhaust gas post treatment system having partial stream hydrolysis and protection against back flow in the partial stream for internal combustion engines having a turbocharger.

With the internal combustion engines operated these days in commercial vehicles an at least singlestage turbocharger arrangement is frequently provided, which with the aid of the exhaust gas enthalpy contained in the exhaust gas stream, compresses the combustion air supply to the internal combustion engine. For the exhaust gas post treatment, however, this causes problems because the exhaust gas that flows over the turbines of the exhaust gas turbocharger or turbochargers is inherently significantly cooled off by them. An exhaust gas stream cooled off in this manner is, in particular during a start-up operation and in the lower partial throttle range, not in a position to achieve adequate exhaust gas temperatures for the hydrolysis of the reduction agent. Even if hydrolysis catalytic converters are used, the temperature level is generally not sufficient. The arrangement of FIG. 4 provides remedial relief for this problem. As shown in FIG. 4, the exhaust gas stream coming from the internal combustion engine (not illustrated) already branches off upstream of the turbine 14 of the exhaust gas turbocharger 13 in such a way that a partial exhaust gas stream 11' is removed therefrom, while the remaining exhaust gas is guided over the turbine 14, drives the compressor 15 via the turbine, and leaves the turbocharger as the exhaust gas stream 10'.

Also with this example the hydrolysis of the reduction agent is effected in the partial exhaust gas stream 11', for this purpose, via a metering or dosing arrangement, comprised of supply tank 8, metering device 9 and nozzle 2', the reduction agent is fed into the partial exhaust gas stream 11' as a function of operating parameters of the internal combustion engine. Due to the relatively high exhaust gas temperature that exists in the partial exhaust gas stream 11, and the hydrolysis catalytic converter disposed downstream of the supply location, the reduction agent can release ammonia without the production of problematic production products, such as cyanuric acid.

Parallel to the partial exhaust gas stream 11', the exhaust gas stream 10' coming from the exhaust gas turbocharger 13 is guided over an oxidation catalytic converter 4' that, just like with the above-described examples, oxidizes nitric oxide contained in the exhaust gas stream 10' to nitrogen dioxide. The return of the partial exhaust gas stream 11 into the exhaust gas stream 10, occurs downstream of the oxidation catalytic converter 4'. The exhaust gas coming from the partial exhaust gas stream 11' and laden with ammonia, and the exhaust gas from the exhaust gas stream 10' that is enriched with nitrogen dioxide, then flow through a particle separator 5 that is disposed downstream of the return location and that on the one hand provides for a thorough mixing and homogeneous distribution of the substituents contained in the exhaust gas, and on the other hand accumulates carbon particles from the exhaust gas that, with the aid of the nitrogen dioxide produced in the oxidation catalytic converter 4', are continuously converted to carbon monoxide, carbon dioxide, nitrogen and nitric oxide. Disposed downstream of the particle separator 5 is an SCR catalytic converter 6' that by way of selective catalytic reduction converts the nitrogen oxides present in the exhaust gas to nitrogen and water vapor. To avoid ammonia slippage, the downstream region of the SCR catalytic converter 6' is coated with an active material that forms an $NH_3$-oxidation catalyst 7'.

Damage to those components of the internal combustion engine that come into contact with exhaust gas due to exhaust gas flowing back under certain operating conditions, which exhaust gas is laden with ammonia released from the reduction agent or with byproducts formed during the release, is avoided by a combination of an oxidation catalytic converter 16' and an SCR catalytic converter 17', which combination is disposed between where the partial exhaust gas stream 11' branches off and the supply location of the reduction agent, and with the SCR catalytic converter 17', as viewed in the normal direction of flow of the exhaust gas indicated by the arrows, is disposed downstream of the oxidation catalytic converter 16'. In this connection, the oxidation catalytic converter 16' of the combination effects a conversion of nitric oxide to nitrogen dioxide. If on the other hand a reversal of the exhaust gas flow occurs, for example during engine braking operation, the ammonia contained in the exhaust gas is converted to nitrogen and water vapor as it flows through the SCR catalytic converter 17' with the aid of the nitrogen oxides or residual oxygen contained in the exhaust gas, according to equations (1) and (3). If no nitrogen oxides are any longer present in the exhaust gas, the ammonia that flows back is oxidized in the oxidation catalytic converter 16'.

In order during longer-lasting back flow phases to provide relief to the aforementioned combination of SCR catalytic converter 17' and oxidation catalytic converter 16', provided between the SCR catalytic converter 17' and the supply location for the reduction agent is a shutoff device 12, which can be controlled by an engine control unit (not illustrated) as a function of operating parameters of the internal combustion engine. The operating parameters of the internal combustion engine at which a shutoff occurs, can be determined by the engine control unit via sensors and/or by means of performance characteristics stored in the engine control unit.

The shutoff device 12 can furthermore be utilized in those operating states in which the exhaust gas flows in the normal direction of flow, in other words in the direction indicated by the arrows, to control or regulate the mass flow or exhaust gas quantity in the partial exhaust gas stream 11'. For this purpose, as a function of operating parameters of the internal combustion engine, a throttling of the partial exhaust gas stream 11' occurs continuously or in discrete steps. The thus achieved variability of the partial exhaust gas steam 11' makes it possible to more precisely control the concentration of ammonia in the exhaust gas required for the SCR reaction.

As a deviation to the example of FIG. 4, it is to be understood that the shutoff device 12 could also be disposed at any other desired location between where the partial exhaust gas stream 11' branches off and the supply location of the reduction agent. It is furthermore conceivable to also provide an appropriate shutoff device in the arrangements of FIGS. 2 and 3. As a simplification of the arrangement, there is finally the possibility, instead of the controlled or regulated shutoff device 12, to provide a simple check valve that closes upon reversal of flow in the partial exhaust gas stream 11'.

If, as a deviation to the example of FIG. 4, the turbine 14 is a double-flow turbine, whereby one channel is supplied with exhaust gas from a first number of cylinders, and the other channel is supplied with exhaust gas from a second number of cylinders, it is advantageous to branch the partial exhaust gas stream off from one of the two channels. The cylinders of the channel from which the partial exhaust gas stream is branched, can then be operated with other engine parameters (e.g. fuel injection times or quantities) than are the cylinders of the other channel, so that it is advantageously possible to optimize the conditions in the partial exhaust gas stream with regard to the preparation of the reduction agent by, for example, raising the exhaust gas temperature in the start-up phase or in the low throttle range, for example by a secondary injection in the expansion or exhaust stroke, With internal combustion engines having two banks of cylinders, whereby each cylinder bank generally has its own exhaust gas turbocharger, so that the turbine of one of the turbochargers is supplied with exhaust gas from one of the bank of cylinders of the internal combustion engine and the turbine of the other turbocharger is supplied with exhaust gas from the other bank of cylinders of the engine, it is advantageous to branch the partial exhaust gas stream off from the exhaust gas stream upstream of the turbine of one of the two exhaust gas turbochargers. The cylinders of the bank of cylinders, from the exhaust gas section of which the partial exhaust gas stream is branched off, can then operate with other engine parameters (e.g. fuel injection time or quantities) than are the cylinders of the other bank of cylinders, so that here also it is advantageously possible to optimize the conditions in the partial exhaust gas stream with regard to the preparation of the reduction agent by raising, for example, the exhaust gas temperature in the start-up phase or in the low throttle range, for example by secondary injection in the expansion or exhaust stroke.

With regard to the catalytic converters mentioned in the previous examples, it is noted that they are complete catalytic converters and/or coated catalytic converters, whereby the active components thereof can be applied to ceramic and/or metallic and/or silica-containing and/or quartz-containing substrates. Such catalytic converters can be produced with the aid of a number of known manufacturing processes; in this regard, reference is made to details contained in the pertinent technical literature.

For the oxidation catalytic converters mentioned in the preceding examples for the oxidation of ammonia, as well as for the further oxidation catalytic converters, platinum and/or palladium, and/or iridium, and/or oxides thereof, and/or $IrTiO_x$ and/or zeolites can be used as active materials. As the active components for the SCR catalytic converters for the reduction of nitrogen oxides with the aid of ammonia, vanadium, and/or vanadium pentoxide and/or titanium dioxide and/or tungsten oxide and/or copper-containing zeolites and/or iron-containing zeolites and/or cobalt-containing zeolites can be used. For the hydrolysis catalytic converter for the improvement of the release of ammonia, titanium dioxide and/or silicon dioxide and/or aluminum oxide and/or zeolites can be used as active components.

It can additionally be expedient to accommodate a plurality of catalytic converters and/or particle separators in a common housing in order to save space and to reduce costs.

Since when using particle separators or particle filters, the separators or filters can become clogged from oil ash, it is expedient to construct the filters in such a way that they can be exchanged or removed and hence are easy to clean.

In order to be able to operate the exhaust gas post treatment system in its optimal operating range, the exhaust gas temperature and/or the content of nitrogen dioxide can be varied at the devices for the separation of particles by adjusting engine parameters and/or by raising the hydrocarbon concentration with the aid of an adjustment of engine parameters such as the fuel injection times or quantities and/or by supplying hydrocarbons to the exhaust gas stream upstream of the catalytic converters for the oxidation of nitric oxide, which at the same time effect the oxidation of hydrocarbons and/or carbon monoxide.

The previously described embodiments can, of course, be realized in many ways by one of skill in the art without straying from the basic inventive concept; thus, the embodiments described are provided by way of example only.

The specification incorporates by reference the disclosure of Germany priority document DE 10 2006 038 289.7 filed 16 Aug. 2006.

The present invention is, of course, in no way restricted to the specific disclosure of the specification and drawings, but also encompasses any modifications within the scope of the appended claims.

What I claim is:

1. An exhaust gas post treatment system for nitrogen oxide reduction of an internal combustion engine operated with excess air, comprising:
   an SCR catalytic converter disposed in the exhaust gas stream of the internal combustion engine for reducing nitrogen oxides, wherein a partial exhaust gas stream is branched off from said exhaust gas stream upstream of said SCR catalytic converter;
   a supply tank for a reduction agent;
   a metering device for receiving said reduction agent from said supply tank and for adding said reduction agent to said partial exhaust gas stream at a supply location, wherein said reduction agent is ammonia or a material that is adapted to release ammonia downstream of said supply location as a result of the hot exhaust gas, and wherein said partial exhaust gas stream is returned to said exhaust gas stream at a return location downstream of said supply location and upstream of said SCR catalytic converter, and wherein said SCR catalytic converter reduces the nitrogen oxides contained in said exhaust gas stream with the aid of the ammonia or released ammonia, by way of selected catalytic reduction, to nitrogen and water vapor; and
   an oxidation catalytic converter disposed in said partial exhaust gas stream upstream of said supply location for said reduction agent, wherein at engine operating conditions at which a reversal of said exhaust gas stream in a direction toward the internal combustion engine occurs, said oxidation catalytic converter is adapted to oxidize at least one of ammonia and reduction agent decomposition products that flow back.

2. An exhaust gas post treatment system according to claim 1, wherein said oxidation catalytic converter for the oxidation of ammonia in said partial exhaust gas stream is simultaneously provided with SCR activity for nitrogen oxides.

3. An exhaust gas post treatment system according to claim 1, wherein an $NH_3$-oxidation catalytic converter or catalyst is disposed downstream of said SCR catalytic converter.

4. An exhaust gas post treatment system according to claim 1, wherein a plurality of at least one of catalytic converters and separation devices are accommodated in a common housing.

5. An exhaust gas post treatment system according to claim 1, wherein said oxidation catalytic converter is embodied in such a way that, in addition to the at least one of ammonia and the reduction agent decomposition products that flow back, at engine operating conditions at which the exhaust gas flows away from the internal combustion engine, said oxidation catalytic converter is also adapted to oxidize at least one of the materials selected from the group consisting carbon monoxide, nitric oxide, and hydrocarbons that are carried along in the exhaust gas.

6. An exhaust gas post treatment system according to claim 5, wherein said oxidation catalytic converter for the oxidation of ammonia is provided with different properties, as viewed along a direction of flow of said exhaust gas, such that a side that is adjacent to said supply location for the reduction agent oxidizes ammonia, preferable selectively, to nitrogen and water, and an opposite side oxidizes at least one of the materials selected from the group consisting of carbon monoxide, nitric oxide and hydrocarbons, carried along is said exhaust gas, in a conversion-optimized manner.

7. An exhaust gas post treatment system according to claim 6, wherein that side of said oxidation catalytic converter for the oxidation of ammonia that is adjacent to the supply location for the reduction agent has a greater charge of at least one of the materials selected from the group consisting of palladium, iridium, and zeolites than does the side that faces the internal combustion engine.

8. An exhaust gas post treatment system according to claim 6, wherein that side of said oxidation catalytic converter for the oxidation of ammonia that is adjacent to the supply location for the reduction agent has a lower charge of at least one of the materials selected from the group consisting of platinum and oxides thereof than does the side that faces the internal combustion engine.

9. An exhaust gas post treatment system according to claim 1, wherein a further SCR catalytic converter, for a selective reduction of nitrogen oxides with the aid of ammonia that flows back, is disposed in said partial exhaust gas stream downstream of said oxidation catalytic converter and upstream of said supply location for the reduction agent.

10. An exhaust gas post treatment system according to claim 9, wherein said oxidation catalytic converter in said partial exhaust gas stream, and said further SCR catalytic converter that is disposed downstream of said oxidation catalytic converter, are combined to form a single component.

11. An exhaust gas post treatment system according to claim 9, wherein said SCR catalytic converter and said further SCR catalytic converter for the reduction of nitrogen oxides with the aid of ammonia contain at least one of the materials selected from the group consisting of vanadium, vanadium pentoxide, titanium dioxide, tungsten oxide, copper-containing zeolites, iron-containing zeolites, and cobalt-containing zeolites as active component.

12. An exhaust gas post treatment system according to claim 1, wherein a hydrolysis catalytic converter is disposed downstream of said supply location for the reduction agent, and wherein said hydrolysis catalytic converter facilitates release of ammonia from the reduction agent.

13. An exhaust gas post treatment system according to claim 12, wherein said hydrolysis catalytic converter for the release of ammonia contains at least one of the materials selected from the group consisting of titanium dioxide, silicon dioxide, aluminum oxide, and zeolites as active component.

14. An exhaust gas post treatment system according to claim 1, wherein at least one separation device, for a separation of particles from said exhaust gas, is disposed in at least one of said partial exhaust gas stream and in said exhaust gas stream downstream of said supply location for the reduction agent.

15. An exhaust gas post treatment system according to claim 14, wherein said at least one separation device is disposed in said exhaust gas stream upstream or downstream of said SCR catalytic converter.

16. An exhaust gas post treatment system according to claim 14, wherein at least one of an exhaust gas temperature and a content of nitrogen dioxide at said separation device for separation of particles is adapted to be varied upstream of a further oxidation catalytic converter by adjustment of engine parameters and/or by raising a hydrocarbon concentration with the aid of an adjustment of engine parameters and/or by a supply of hydrocarbon into said exhaust gas stream.

17. An exhaust gas post treatment system according to claim 14, wherein at least one separation device is constructed such that it is adapted to be exchanged or removed.

18. An exhaust gas post treatment system according to claim 1, wherein a further oxidation catalytic converter is disposed upstream of said return location of said partial exhaust gas stream to said exhaust gas stream, and wherein during a normal direction of flow of said exhaust gas away from the internal combustion engine said further oxidation catalytic converter at least partially converts the nitric oxide contained in said exhaust gas stream to nitrogen dioxide.

19. An exhaust gas post treatment system according to claim 18, wherein at least one of the materials from the group consisting of platinum, palladium, iridium, oxides thereof, $IrTiO_x$, and zeolites is used as active component for said oxidation catalytic converter for at least one of the oxidation of ammonia and for said further oxidation catalytic converter.

20. An exhaust gas post treatment system according to claim 18, wherein active components of said oxidation catalytic converter for the oxidation of at least one of ammonia and reduction agent decomposition products that flow back, and active components of said further oxidation catalytic converter, differ from one another and are respectively optimized to subsequent chemical reactions.

21. An exhaust gas post treatment system according to claim 1, wherein at least one turbine of at least one exhaust gas turbocharger is disposed in said exhaust gas stream, and wherein a branching-off of said partial exhaust gas stream, to which the reduction agent is supplied, is effected upstream of said at least one turbine of said exhaust gas turbocharger.

22. An exhaust gas post treatment system according to claim 21, wherein said turbine is a double-flow turbine, further wherein one channel thereof is supplied with exhaust gas from at least one first cylinder of the internal combustion engine and the other channel thereof is supplied with exhaust gas from at least one second cylinder of the internal combustion engine, and wherein said partial exhaust gas stream is branched off from one of said two channels.

23. An exhaust gas post treatment system according to claim 22, wherein the cylinders of that channel of the turbine from which the partial exhaust gas stream is branched off is adapted to be operated with other engine parameters than are the cylinders of the other channel.

24. An exhaust gas post treatment system according to claim 21, wherein two exhaust gas turbochargers are provided, further wherein the turbine of one of said turbochargers is supplied with exhaust gas from a first bank of cylinders of the internal combustion engine and the turbine of the other turbocharger is supplied with exhaust gas from a second bank of cylinders of the internal combustion engine, and wherein said partial exhaust gas stream is branched off from said exhaust gas stream upstream of the turbine of one of said two exhaust gas turbochargers.

25. An exhaust gas post treatment system according to claim 24, wherein the bank of cylinders, from the exhaust gas section of which said partial exhaust gas stream is branched off, is adapted to be operated with other engine parameters than is the other bank of cylinders.

26. An exhaust gas post treatment system according to claim 1, wherein a flow-control element is disposed in said partial exhaust gas stream for control or regulation of at least one of a volume velocity and quantity of said exhaust gas in said branched-off portion.

27. An exhaust gas post treatment system according to claim 26, wherein said flow-control element is a check valve or a controllable or regulatable shut off element disposed in said partial exhaust gas stream upstream of the supply location for the reduction agent.

28. An exhaust gas post treatment system for nitrogen oxide reduction of an internal combustion engine operated with excess air, comprising:
    an SCR catalytic converter disposed in the exhaust gas stream of the internal combustion engine for reducing nitrogen oxides, wherein a partial exhaust gas stream is branched off from said exhaust gas stream upstream of said SCR catalytic converter;
    a supply tank for a reduction agent;
    a metering device for receiving said reduction agent from said supply tank and for adding said reduction agent to said partial exhaust gas stream at a supply location, wherein said reduction agent is ammonia or a material that is adapted to release ammonia downstream of said supply location as a result of the hot exhaust gas, and wherein said partial exhaust gas stream is returned to said exhaust gas stream at a return location downstream of said supply location and upstream of said SCR catalytic converter, and wherein said SCR catalytic converter reduces the nitrogen oxides contained in said exhaust gas stream with the aid of the ammonia or released ammonia, by way of selected catalytic reduction, to nitrogen and water vapor;
    an oxidation catalytic converter disposed in said partial exhaust gas stream upstream of said supply location for said reduction agent, wherein at engine operating conditions at which a reversal of said exhaust gas stream in a direction toward the internal combustion engine occurs, said oxidation catalytic converter is adapted to oxidize at least one of ammonia and reduction agent decomposition products that flow back, and
    wherein a further SCR catalytic converter, for a selective reduction of nitrogen oxides with the aid of ammonia that flows back, is disposed in said partial exhaust gas stream downstream of said oxidation catalytic converter and upstream of said supply location for the reduction agent.

29. An exhaust gas post treatment system for nitrogen oxide reduction of an internal combustion engine operated with excess air, comprising:
    an SCR catalytic converter disposed in the exhaust gas stream of the internal combustion engine for reducing nitrogen oxides, wherein a partial exhaust gas stream is branched off from said exhaust gas stream upstream of said SCR catalytic converter;
    a supply tank for a reduction agent;
    a metering device for receiving said reduction agent from said supply tank and for adding said reduction agent to said partial exhaust gas stream at a supply location, wherein said reduction agent is ammonia or a material that is adapted to release ammonia downstream of said supply location as a result of the hot exhaust gas, and wherein said partial exhaust gas stream is returned to said exhaust gas stream at a return location downstream of said supply location and upstream of said SCR catalytic converter, and wherein said SCR catalytic converter reduces the nitrogen oxides contained in said exhaust gas stream with the aid of the ammonia or released ammonia, by way of selected catalytic reduction, to nitrogen and water vapor;
    an oxidation catalytic converter disposed in said partial exhaust gas stream upstream of said supply location for said reduction agent, wherein at engine operating conditions at which a reversal of said exhaust gas stream in a direction toward the internal combustion engine occurs, said oxidation catalytic converter is adapted to oxidize at least one of ammonia and reduction agent decomposition products that flow back, and
    wherein said oxidation catalytic converter for the oxidation of ammonia in said partial exhaust gas stream is simultaneously provided with SCR activity for nitrogen oxides.

30. An exhaust gas post treatment system for nitrogen oxide reduction of an internal combustion engine operated with excess air, comprising:
    an SCR catalytic converter disposed in the exhaust gas stream of the internal combustion engine for reducing nitrogen oxides, wherein a partial exhaust gas stream is branched off from said exhaust gas stream upstream of said SCR catalytic converter;
    a supply tank for a reduction agent;
    a metering device for receiving said reduction agent from said supply tank and for adding said reduction agent to said partial exhaust gas stream at a supply location, wherein said reduction agent is ammonia or a material that is adapted to release ammonia downstream of said supply location as a result of the hot exhaust gas, and wherein said partial exhaust gas stream is returned to said exhaust gas stream at a return location downstream of said supply location and upstream of said SCR catalytic converter, and wherein said SCR catalytic converter reduces the nitrogen oxides contained in said exhaust gas stream with the aid of the ammonia or released ammonia, by way of selected catalytic reduction, to nitrogen and water vapor;
    an oxidation catalytic converter disposed in said partial exhaust gas stream upstream of said supply location for said reduction agent, wherein at engine operating conditions at which a reversal of said exhaust gas stream in a direction toward the internal combustion engine occurs, said oxidation catalytic converter is adapted to oxidize at least one of ammonia and reduction agent decomposition products that flow back, and
    wherein at least one separation device, for a separation of particles from said exhaust gas, is disposed in at least one of said partial exhaust gas stream and in said exhaust gas stream downstream of said supply location for the reduction agent.

31. An exhaust gas post treatment system for nitrogen oxide reduction of an internal combustion engine operated with excess air, comprising:
    an SCR catalytic converter disposed in the exhaust gas stream of the internal combustion engine for reducing nitrogen oxides, wherein a partial exhaust gas stream is branched off from said exhaust gas stream upstream of said SCR catalytic converter;
    a supply tank for a reduction agent;
    a metering device for receiving said reduction agent from said supply tank and for adding said reduction agent to said partial exhaust gas stream at a supply location, wherein said reduction agent is ammonia or a material that is adapted to release ammonia downstream of said supply location as a result of the hot exhaust gas, and wherein said partial exhaust gas stream is returned to said exhaust gas stream at a return location downstream of said supply location and upstream of said SCR catalytic converter, and wherein said SCR catalytic converter reduces the nitrogen oxides contained in said exhaust gas stream with the aid of the ammonia or released ammonia, by way of selected catalytic reduction, to nitrogen and water vapor;

an oxidation catalytic converter disposed in said partial exhaust gas stream upstream of said supply location for said reduction agent, wherein at engine operating conditions at which a reversal of said exhaust gas stream in a direction toward the internal combustion engine occurs, said oxidation catalytic converter is adapted to oxidize at least one of ammonia and reduction agent decomposition products that flow back, and wherein a further oxidation catalytic converter is disposed upstream of said return location of said partial exhaust gas stream to said exhaust gas stream, and wherein during a normal direction of flow of said exhaust gas away from the internal combustion engine said further oxidation catalytic converter at least partially converts the nitric oxide contained in said exhaust gas stream to nitrogen dioxide.

32. An exhaust gas post treatment system for nitrogen oxide reduction of an internal combustion engine operated with excess air, comprising:

an SCR catalytic converter disposed in the exhaust gas stream of the internal combustion engine for reducing nitrogen oxides, wherein a partial exhaust gas stream is branched off from said exhaust gas stream upstream of said SCR catalytic converter;

a supply tank for a reduction agent;

a metering device for receiving said reduction agent from said supply tank and for adding said reduction agent to said partial exhaust gas stream at a supply location, wherein said reduction agent is ammonia or a material that is adapted to release ammonia downstream of said supply location as a result of the hot exhaust gas, and wherein said partial exhaust gas stream is returned to said exhaust gas stream at a return location downstream of said supply location and upstream of said SCR catalytic converter, and wherein said SCR catalytic converter reduces the nitrogen oxides contained in said exhaust gas stream with the aid of the ammonia or released ammonia, by way of selected catalytic reduction, to nitrogen and water vapor;

an oxidation catalytic converter disposed in said partial exhaust gas stream upstream of said supply location for said reduction agent, wherein at engine operating conditions at which a reversal of said exhaust gas stream in a direction toward the internal combustion engine occurs, said oxidation catalytic converter is adapted to oxidize at least one of ammonia and reduction agent decomposition products that flow back, wherein said oxidation catalytic converter is embodied in such a way that, in addition to the at least one of ammonia and the reduction agent decomposition products that flow back, at engine operating conditions at which the exhaust gas flows away from the internal combustion engine, said oxidation catalytic converter is also adapted to oxidize at least one of the materials selected from the group consisting carbon monoxide, nitric oxide, and hydrocarbons that are carried along in the exhaust gas, and wherein said oxidation catalytic converter for the oxidation of ammonia is provided with different properties, as viewed along a direction of flow of said exhaust gas, such that a side that is adjacent to said supply location for the reduction agent oxidizes ammonia, preferable selectively, to nitrogen and water, and an opposite side oxidizes at least one of the materials selected from the group consisting of carbon monoxide, nitric oxide and hydrocarbons, carried along is said exhaust gas, in a conversion-optimized manner.

33. An exhaust gas post treatment system for nitrogen oxide reduction of an internal combustion engine operated with excess air, comprising:

an SCR catalytic converter disposed in the exhaust gas stream of the internal combustion engine for reducing nitrogen oxides, wherein a partial exhaust gas stream is branched off from said exhaust gas stream upstream of said SCR catalytic converter;

a supply tank for a reduction agent;

a metering device for receiving said reduction agent from said supply tank and for adding said reduction agent to said partial exhaust gas stream at a supply location, wherein said reduction agent is ammonia or a material that is adapted to release ammonia downstream of said supply location as a result of the hot exhaust gas, and wherein said partial exhaust gas stream is returned to said exhaust gas stream at a return location downstream of said supply location and upstream of said SCR catalytic converter, and wherein said SCR catalytic converter reduces the nitrogen oxides contained in said exhaust gas stream with the aid of the ammonia or released ammonia, by way of selected catalytic reduction, to nitrogen and water vapor;

an oxidation catalytic converter disposed in said partial exhaust gas stream upstream of said supply location for said reduction agent, wherein at engine operating conditions at which a reversal of said exhaust gas stream in a direction toward the internal combustion engine occurs, said oxidation catalytic converter is adapted to oxidize at least one of ammonia and reduction agent decomposition products that flow back, wherein at least one turbine of at least one exhaust gas turbocharger is disposed in said exhaust gas stream, and wherein a branching-off of said partial exhaust gas stream, to which the reduction agent is supplied, is effected upstream of said at least one turbine of said exhaust gas turbocharger.

* * * * *

UNITED STATES PATENT AND TRADEMARK OFFICE
CERTIFICATE OF CORRECTION

PATENT NO. : 7,802,419 B2 Page 1 of 1
APPLICATION NO. : 11/840127
DATED : September 28, 2010
INVENTOR(S) : Andreas Döring It is certified that error appears in the above-identified patent and that said Letters Patent is hereby corrected as shown below:

On the Title page item (57),
line 10 of the ABSTRACT, at the end of the line, the characters "1J" need to be deleted. The sentence should read as follows:

...upstream of the SCR catalytic converter, which reduces the nitrogen oxides...

Signed and Sealed this

Sixteenth Day of November, 2010

David J. Kappos
*Director of the United States Patent and Trademark Office*